(12) United States Patent
Cibien (10) Patent No.: US 9,556,957 B2
(45) Date of Patent: Jan. 31, 2017

(54) COMPACT CLUTCH

(71) Applicant: BI.CI.DI. SRL, San Colombano al Lambro (IT)

(72) Inventor: Angelo Cibien, San Colombano al Lambro (IT)

(73) Assignee: BI.CI.DI. SRL, San Colombano al Lambro (MI) (IT)

( * ) Notice: Subject to any disclaimer, the term of this patent is extended or adjusted under 35 U.S.C. 154(b) by 7 days.

(21) Appl. No.: 14/848,847

(22) Filed: Sep. 9, 2015

(65) Prior Publication Data

US 2016/0076647 A1 Mar. 17, 2016

(30) Foreign Application Priority Data

Sep. 15, 2014 (IT) .............................. MI2014A1587

(51) Int. Cl.
| | | |
|---|---|---|
| *F16H 57/00* | (2012.01) | |
| *F16H 63/04* | (2006.01) | |
| *F16H 1/02* | (2006.01) | |
| *F16D 19/00* | (2006.01) | |
| *F16D 13/02* | (2006.01) | |
| *F16H 63/30* | (2006.01) | |

(52) U.S. Cl.
CPC ............. *F16H 63/04* (2013.01); *F16D 13/025* (2013.01); *F16D 19/00* (2013.01); *F16H 1/02* (2013.01); *F16H 2063/3093* (2013.01)

(58) Field of Classification Search
CPC .... F16H 63/04; F16H 1/02; F16H 2063/3093; F16D 13/025; F16D 19/00
See application file for complete search history.

(56) References Cited

U.S. PATENT DOCUMENTS

| 1,968,155 A | 6/1930 | Litchfield | |
|---|---|---|---|
| 3,493,088 A | 2/1970 | Hoff | |
| 2005/0211527 A1* | 9/2005 | Cibien | .................. F16D 13/025 |
| | | | 192/48.92 |

(Continued)

FOREIGN PATENT DOCUMENTS

| FR | 2833674 A1 | 6/2003 |
|---|---|---|
| IT | 1311501 B1 | 3/2002 |

(Continued)

OTHER PUBLICATIONS

Search Report and Written Opinion dated May 18, 2015 for IT App. MI20141587, from which the instant application is based, 7 pgs.

*Primary Examiner* — William Kelleher
*Assistant Examiner* — Zakaria Elahmadi
(74) *Attorney, Agent, or Firm* — Fredrikson & Byron, P.A.

(57) ABSTRACT

A compact clutch which comprises a driven shaft on which the following are mounted: a gear wheel; a driving bush; a driven bush; a coil spring; a first collar with cam surfaces; and a second collar with cam surfaces. The clutch is characterized in that the gear wheel and the bushes are constrained to the driven shaft in the axial direction by means of two stop rings; in that the driven bush is constrained to the driven shaft in the circumferential direction by means of at least one tongue; and in that the tongue ensures engagement between the driven bush and the driven shaft in the circumferential direction, while in the axial direction the driven bush may slide with respect to the driven shaft.

22 Claims, 7 Drawing Sheets

(56) References Cited

U.S. PATENT DOCUMENTS

| | | | | |
|---|---|---|---|---|
| 2008/0000322 A1* | 1/2008 | Hillyer | ................... | B60K 17/28 |
| | | | | 74/665 G |
| 2010/0101345 A1* | 4/2010 | Moore | ...................... | F16H 3/10 |
| | | | | 74/339 |
| 2012/0048673 A1* | 3/2012 | Mellor | .................... | F16D 13/08 |
| | | | | 192/41 S |
| 2012/0204664 A1* | 8/2012 | Peura | ................... | B60K 17/344 |
| | | | | 74/405 |
| 2014/0251748 A1* | 9/2014 | McCrary | ................ | F16D 19/00 |
| | | | | 192/94 |
| 2014/0345404 A1* | 11/2014 | Wu | ........................ | F16D 11/10 |
| | | | | 74/405 |
| 2016/0017964 A1* | 1/2016 | Yu | ............................ | E06B 9/32 |
| | | | | 160/168.1 P |

FOREIGN PATENT DOCUMENTS

| | | | |
|---|---|---|---|
| JP | 6098223 | A | 6/1985 |
| WO | 9534765 | A1 | 12/1995 |

\* cited by examiner

COMPACT CLUTCH

RELATED APPLICATIONS

This application claims priority to Italian Patent Application No. MI2014A001587, filed Sep. 15, 2014, the contents of which are incorporated herein by reference.

DESCRIPTION

The present invention relates to a compact clutch designed to connect together a driving shaft and a driven shaft, and in particular relates to a compact clutch suitable for installation on small operating machines. The present invention also relates to a drive comprising this compact clutch. The most typical sector for use of the invention is the sector of machines for horticulture or gardening, for example lawn mowers. However, it may be validly used also in other sectors and the person skilled in the art will have no difficulty in extending the scope thereof to the other machines on which it may be used.

The present type of clutch is known, in its more general aspects, for example from the patents U.S. Pat. Nos. 1,968, 155 and 3,493,088. Similar clutches are also described in WO 95/34765, FR 2,833,674 and JP S 60-98223.

The patent IT 1,311,501 also describes a clutch very similar to that which forms the subject of the present description. For an understanding of the technical scope reference may be made to the patent IT 1,311,501. In addition, for easier understanding of the invention, the known form of the clutch will be described below in detail with reference to the FIGS. 1 to 9 attached herewith.

The clutch is denoted in its entirety by the reference number 30 and is usually included in a drive 20. The drive 20 comprises a driving shaft 22, connected to a motor, and a driven shaft 24, connected to the mechanical means which must be moved, typically the driving wheels.

As schematically shown in FIGS. 1 to 5, the drive 20 comprises in a manner known per se a control device 26 which is movable between a working position and a rest position and which allows the operator to connect or disconnect the driving shaft 22 and the driven shaft 24. This possibility of connecting and disconnecting the two shafts is provided precisely by the clutch 30.

Moreover, the drive 20 as a whole is preferably designed to define a ratio between the angular speed $\omega_m$ of the driving shaft 22 and the angular speed $\omega_c$ imparted to the driven shaft 24.

The clutch 30 (see FIGS. 8 and 9) comprises a driving bush 34 which is rigidly connected to the gear wheel 32 by means of axial pins 324. The driving bush therefore is rotated directly by the motor via the driving shaft 22 and, for example, a worm (not shown in the attached figures) which engages the gear wheel 32.

Figure 8:
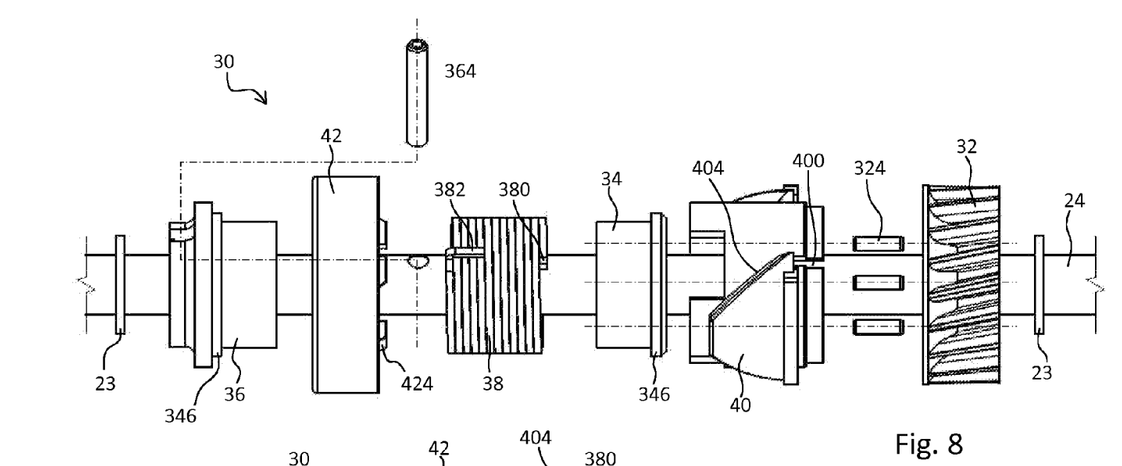
FIG. 8 shows an exploded view of a compact clutch according to the prior art.
Figure 9:
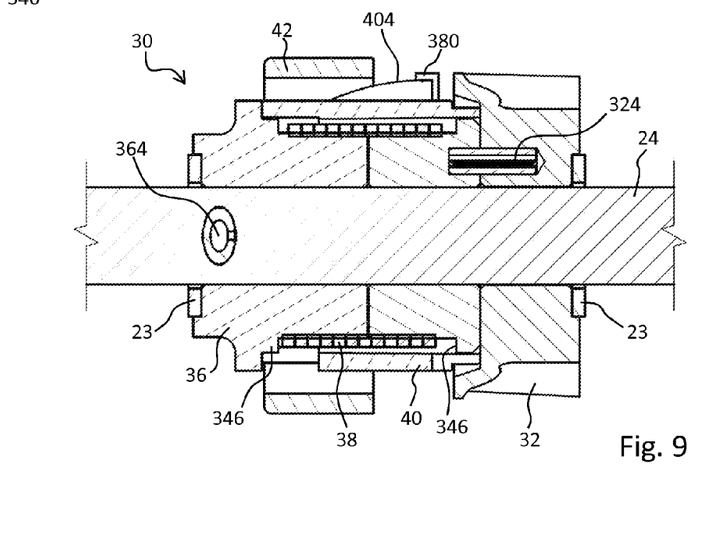
FIG. 9 shows an axially sectioned view of a compact clutch according to the prior art.
Figure 10:
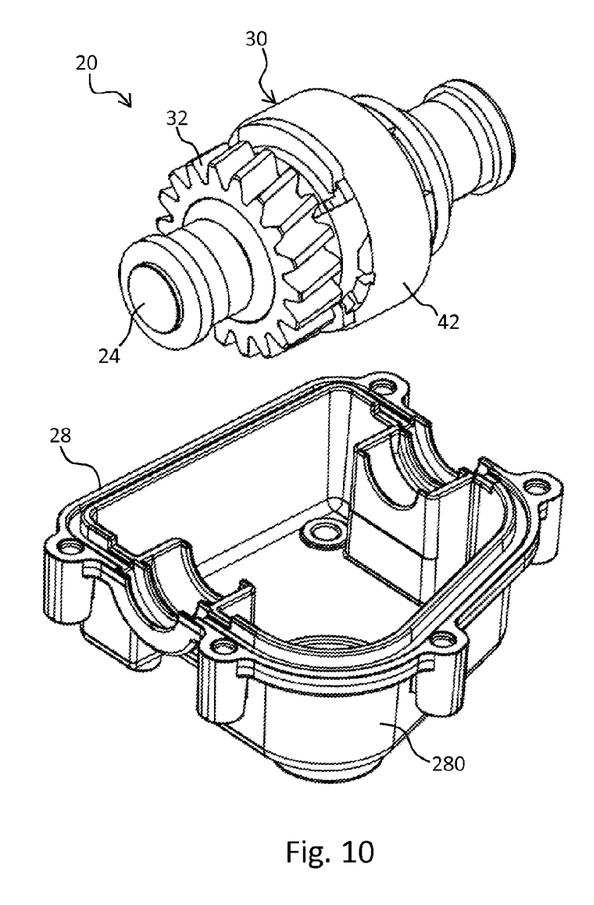
FIG. 10 shows a perspective view in which a drive according to the invention has been disassembled in order to show the compact clutch.
Figure 11:
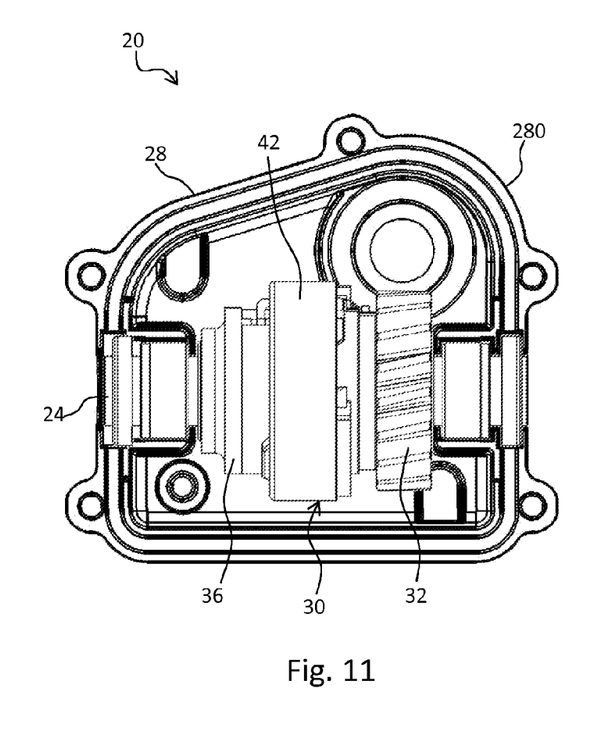
FIG. 11 shows a plan view in which a drive according to the invention has been disassembled in order to show the compact clutch.

Next to the driving bush 34 there is a driven bush 36 which is rigidly connected to the driven shaft 24 by a pin 364. A coil spring 38, the ends 380 and 382 of which project radially outwards, is wound around the two bushes 34 and 36. A first collar 40 is arranged around the coil spring 38 and comprises a first recess 400 adapted to receive the first end 380 of the coil spring 38. The first collar 40 also comprises, on its radially outer surface, cam surfaces 404. A second collar 42 is also arranged around the first collar 40 and comprises a second recess 420 adapted to receive the second end 382 of the coil spring 38. The second collar 42 also comprises, on its radially inner surface, cam surfaces 424 which are adapted to cooperate with the cam surfaces 404 of the first collar 40.

Figure 1:
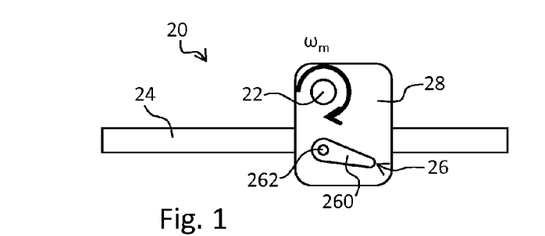
FIG. 1 shows in schematic form a plan view of a drive according to the prior art in a rest configuration.
Figure 2:
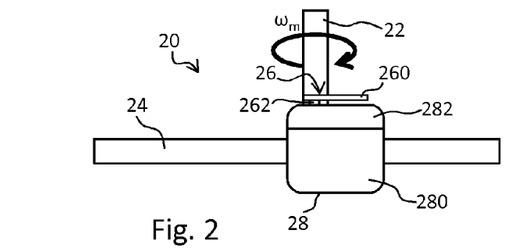
FIG. 2 shows an elevation view of the drive according to FIG. 1.
Figure 3:
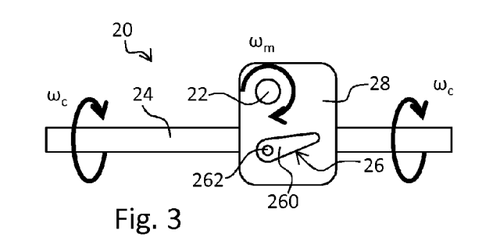
FIG. 3 shows in schematic form a plan view of a drive according to the prior art in a working configuration.
Figure 4:
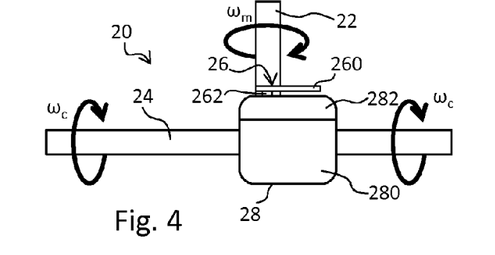
FIG. 4 shows an elevation view of the drive according to FIG. 3.
Figure 5:
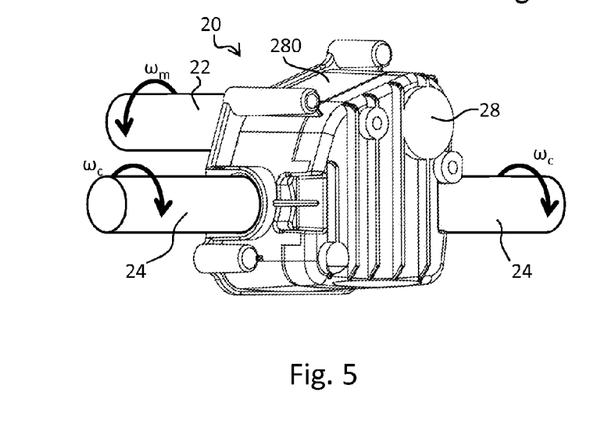
FIG. 5 shows a perspective view of a drive according to the prior art in a working configuration.
Figures 6, 7:
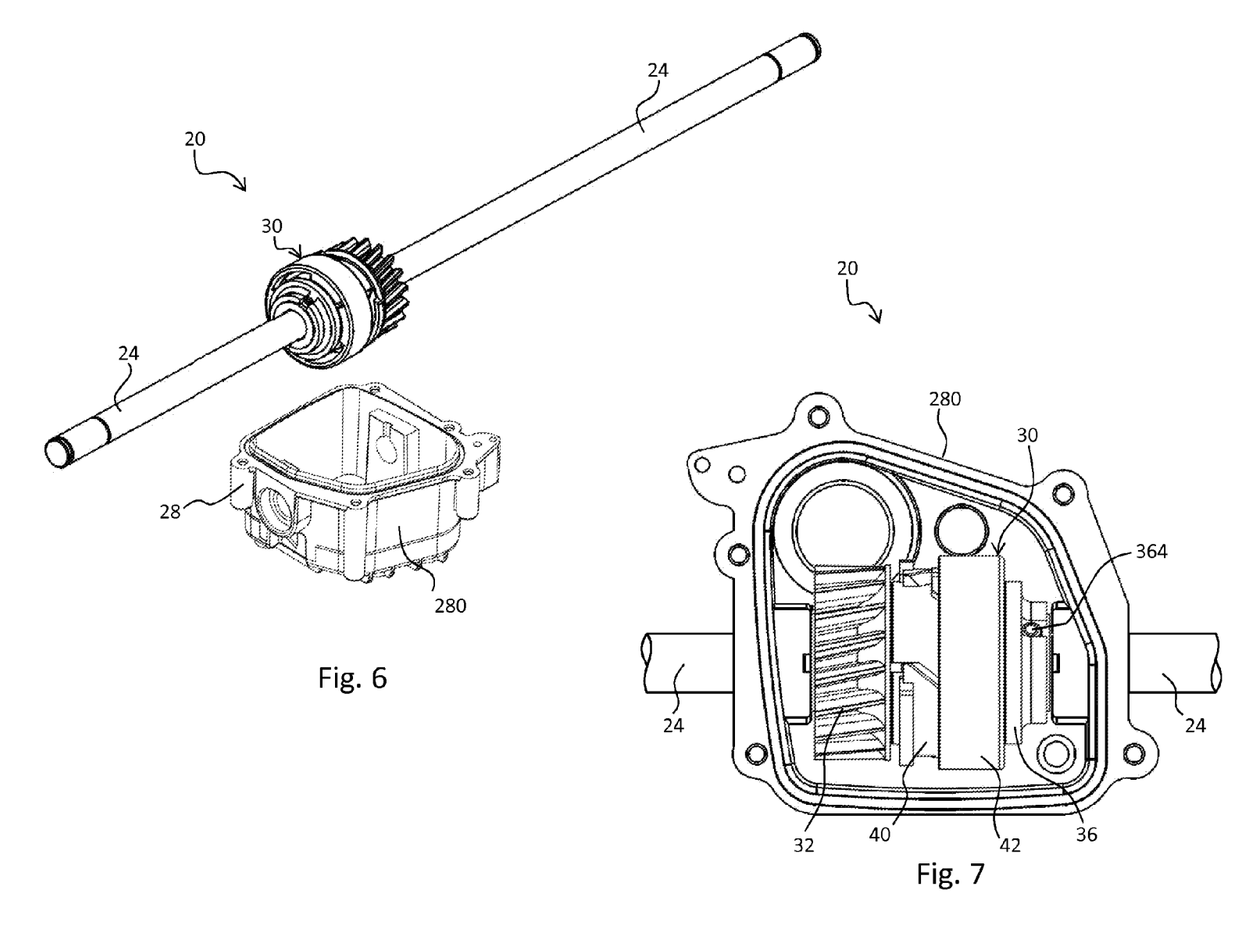
FIG. 6 shows a perspective view in which a drive according to the prior art has been disassembled in order to show the compact clutch.
FIG. 7 shows a plan view in which a drive according to the prior art has been disassembled in order to show the compact clutch.

In the rest configuration of the drive 20, i.e. when the operator does not operate the control device 26, the internal diameter of the coil spring 38 is slightly greater than the external diameter of the two bushes 34 and 36. The rotational movement of the driving shaft 22 therefore causes rotation of the gear wheel 32 and, along with it, the driving bush 34 which rotates freely inside the coil spring 38. In this configuration, which is schematically shown in FIGS. 1 and 2, no other part of the clutch 30 is rotated.

When, however, the operator decides to set the drive 20 to the working configuration, he/she operates the control device 26 which, by means of a fork (not shown in the drawings), axially displaces the second collar 42 with respect to the first collar 40. The cam surfaces 424 and 404 convert the axial relative movement into a circumferential relative movement of the first collar 40 and the second collar 42. This rotation is also transmitted to the ends 380 and 382 of the coil spring 38. More specifically, the rotation thus obtained is in the direction of winding of the coil spring 38 and therefore results in a reduction in the internal diameter of the latter. The coil spring 38 therefore tightens around the two bushes 34 and 36, rigidly connecting them together by means of friction. Since the driven bush 36 is rigidly connected to the driven shaft 24, the latter is also caused to rotate. It should be noted that the rotation of the driven bush 34 is usually oriented in such way that it also tends to wind the coil spring 38, thus increasing the friction effect. When the operator then decides to set the drive 20 back to the rest configuration, he/she again operates the control device 26 so as to interrupt the axial thrust on the second collar 42. The interruption of this thrust therefore allows the collars 40 and 42 to return into their initial positions, also bringing the ends 380 and 382 of the coil spring 38 into their respective initial rest positions. The relative rotation resulting therefrom is in a direction opposite to the direction of winding of the coil spring 38 and therefore results in an increase in the internal diameter of the latter. The coil spring 38 therefore ceases to be tightened around the two bushes 34 and 36, so that they become again independent of each other.

The drive 20 which comprises the clutch 30 described above is contained inside a housing 28 which comprises a box 280 and a lid 282 and from which housing 28 only the driving shaft 22, the driven shaft 24 and the control device 26 protrude. This configuration allows very small overall dimensional values to be obtained, in particular with regard to the power transmitted. Moreover, with this particular type of clutch it is possible to achieve the result that the force required to operate the control device 26 is entirely independent of the power transmitted, the force of the coil spring 38 and/or any other force associated with operation of the clutch. In practical terms, the control device 26 is usually provided with its own return spring, the force of which is designed to provide the user with a clear indication of the return action, but without this however creating unnecessary fatigue. This type of clutch described above, while being widely used, is however not without defects.

Firstly, as seen above, the clutch 30 as a whole is axially constrained along the driven shaft 24 only by means of the pin 364 of the driven bush 36. This has the effect that the walls of the housing 28 play a more important role than simply that of containing the components and the associated lubrication oil. The walls of the housing 28, as can be clearly seen in FIG. 7, define a constraint in the axial direction for the components of the clutch 30 which bear against it by means of special washers 23. In addition, it must also be considered that the particular transmission of the movement by means of the worm and the gear wheel 32 gives rise to an axial thrust along the driven shaft 24. This thrust is such that the bearing action of the clutch against the walls of the housing 28 is not only fortuitous, but on the contrary systematic, constant and relatively energetic during operation of the drive 20.

As a result, with prolonged operation of the drive 20, a considerable amount of wear on the walls of the housing 28 and/or the washers may be noted. This wear usually gives rise to axial play which, in the long run, has an adverse effect on operation of the clutch 30 and of the entire drive 20.

It has been noted, in fact, that an elongation of the coil spring 38 in the axial direction results in a reduction in the torque which may be transmitted from the driving bush 34 to the driven bush 36 and therefore, ultimately, a reduction in the torque which may be transmitted by the drive 20 as a whole. However, the most serious malfunction which may occur as a result of the formation of this axial play is that a coil of the coil spring 38 may become wedged between the two bushes 34 and 36. In this case, operation of the drive 20 is definitively compromised and the drive must be replaced.

There are also a number of drawbacks of a logistical nature. As may be noted from FIGS. 5 to 7, the box 280 comprises two holes for receiving the driven shaft 24. The holes are formed in the wall of the box so as to be completely contained within it. The shape of these holes allows insertion of the shaft 24 only in the axial direction and a precise assembly sequence of the drive 20 is required. Firstly, the entire clutch 30, with the sole exception of the driven shaft 24, must be assembled. Then the clutch 30 must be positioned inside the box 280. At this point the shaft 24 may be inserted axially, in succession, through a first hole in the box 280, through the clutch 30 and through the second hole in the box 280. Only at this point may the pin 364, which keeps the whole assembly in position, be inserted. Before insertion of the pin 364, the clutch 30 is subject to undesirable disassembly operations which make the assembly step relatively complex. Then the driving shaft 22 with the respective worm and the control device 26 with the respective fork are mounted, and, once the lubrication oil for the mechanical components has been added, the lid 282 is mounted so as to close the box 280 of the housing 28.

From this assembly sequence it can be immediately understood why there are no other axial retaining means apart from the pin 364. Moreover, the drive 20 described above must necessarily be provided in its definitive configuration because this is the only one able to ensure sufficient resistance to accidental disassembly.

A further drawback of this known constructional form of the clutch 30 arises from the need to provide a hole for the pin 364 in the driven shaft 24. Following correct definition of the dimensions of the pin 364, it is required in some cases to form a hole with a diameter equal to nearly one third of the diameter of the driven shaft 24. The resistant cross-section of the driven shaft 24 is therefore locally reduced and the shaft as a whole is significantly weakened (see in this connection FIG. 9).

The object of the present invention is therefore to overcome at least partially the drawbacks mentioned above with reference to the prior art.

In particular, a task of the present invention is to provide a compact clutch which is resistant to wear and robust.

Another task of the present invention is to provide a compact clutch and a drive which allow greater flexibility in terms of supply compared to the known constructional forms.

The object and the tasks indicated above are achieved by a compact clutch according to claim 1 and by a drive according to claim 5.

The characteristic features and further advantages of the invention will become clear from the description, provided hereinbelow, of a number of examples of embodiment, provided by way of a non-limiting example, with reference to the accompanying drawings.

With reference to the attached figures, 30 denotes in its entirety a clutch according to the invention. The clutch 30 comprises a driven shaft 24 on which the following are mounted:
- a gear wheel 32;
- a driving bush 34;
- a driven bush 36;
- a coil spring 38 with two ends 380, 382;
- a first collar 40 comprising a first recess 400 and, on its radially outer surface, cam surfaces 404;
- a second collar 42 comprising a second recess 420 and, on its radially inner surface, cam surfaces 424;

In the compact clutch 30:
- the gear wheel 32, the driving bush 34 and the driven bush 36 are arranged axially next to each other;
- the gear wheel 32 and the driving bush 34 are constrained together in the circumferential direction;
- the driving bush 34 and the driven bush 36 have the same external diameter;

the coil spring 38 has, in the rest condition, an internal diameter slightly greater than the external diameter of the driving bush 34 and the driven bush 36;

the coil spring 38 surrounds externally the driving bush 34 and the driven bush 36;

the first collar 40 surrounds externally the coil spring 38 and the first recess 400 receives the first end 380 thereof; and the second collar 42 surrounds externally the first collar 40 and the second recess 420 receives the second end 382 of the coil spring 38.

The second collar 42 may be displaced in an axial direction between a rest position and a working position;

when the second collar 42 is in the rest position the coil spring 38 is in the rest condition;

when the second collar 42 is displaced into the working position:

the cam surfaces 404, 424 convert the axial displacement of the second collar 42 into a relative rotation between the first collar 40 and the second collar 42;

the relative rotation between the first collar 40 and the second collar 42 produces a relative rotation between the first end 380 and of the second end 382 of the coil spring 38;

the relative rotation between the first end 380 and of the second end 382 produces a tightening of the coil spring 38 around the driving bush 34 and the driven bush 36;

the tightening of the coil spring 38 constrains together by means of friction the driving bush 34 and the driven bush 36.

The compact clutch 30 according to the invention is characterized in that the gear wheel 32, the driving bush 34 and the driven bush 36 are constrained to the driven shaft 24 in the axial direction by means of two stop rings 326, 366; in that the driven bush 36 is constrained to the driven shaft 24 in the circumferential direction by means of at least one tongue 362; and in that the at least one tongue 362 ensures engagement between the driven bush 36 and the driven shaft 24 in the circumferential direction, while in the axial direction the driven bush 36 may slide with respect to the driven shaft 24 at least on one side.

As the person skilled in the art may easily understand, the driven shaft 24 of the clutch 30 unambiguously defines an axis of rotation X. In the present discourse, both as regards the description of the prior art and as regards the description of the invention, a number of agreed terms have been used. "Axial" is understood as referring to the direction of any straight line parallel to the axis X. "Radial" is understood as referring to the direction of any half-line having its origin on the axis X and being perpendicular thereto. "Circumferential" is understood as referring to the direction of any circumference centred on the axis X and situated in a plane perpendicular thereto.

As mentioned above, the gear wheel 32 and the driving bush 34 are constrained together in the circumferential direction so that the rotation of one necessarily causes the rotation of the other one. Said gear wheel and driving bush, on the other hand, are not directly constrained in the direction circumferential with respect to the shaft 24. As a result, when the coil spring 38 is in the rest configuration, the gear wheel 32 and the driving bush 34 rotate freely around the shaft 24. Similarly, the driving bush 34 and the driven bush 36 are only arranged next to each other and, when the coil spring 38 is in the rest configuration, they rotate freely with respect to each other around the shaft 24.

Figure 12:
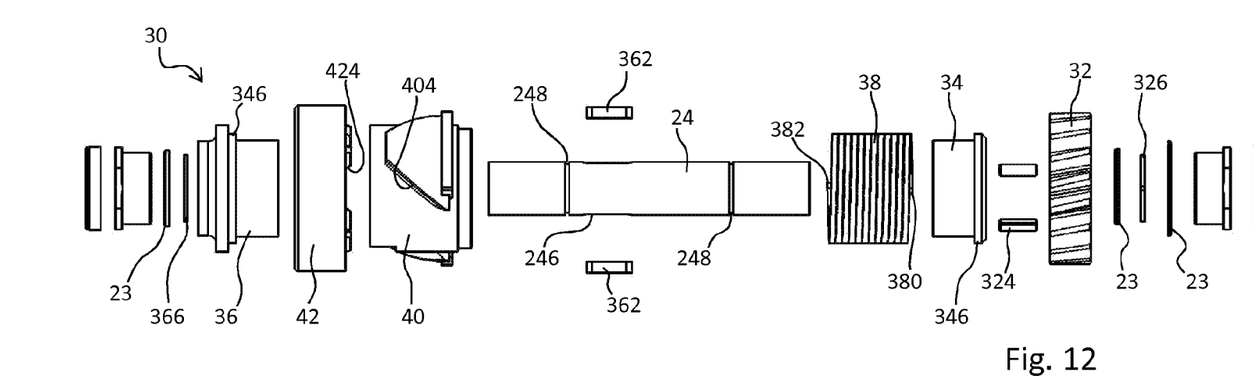
FIG. 12 shows an exploded view of a compact clutch according to the invention.

As already mentioned above, the driven bush 36 is constrained to the driven shaft 24 in the circumferential direction by means of at least one tongue 362. In accordance with the embodiment shown in FIGS. 12 to 14, the driven bush 36 is constrained to the driven shaft 24 in the circumferential direction by means of two tongues 362 which are arranged at 180° with respect to each other. The at least one tongue 362 is partially seated inside a suitable recess 246 formed on the outer surface of the driven shaft 24. The remaining part of the tongue 362 which projects radially from the recess 246 is seated inside a suitable groove 368 formed in the internal diameter of the driven bush 36. As the person skilled in the art may easily understand, therefore, the at least one tongue 362 ensures engagement between the driven bush 36 and the driven shaft 24 in the circumferential direction, while in the axial direction the two parts may slide relative to each other at least in one sense (if for example the grooves 368 are blind) or also in both senses (if for example the grooves 368 are through-grooves).

Figure 13:
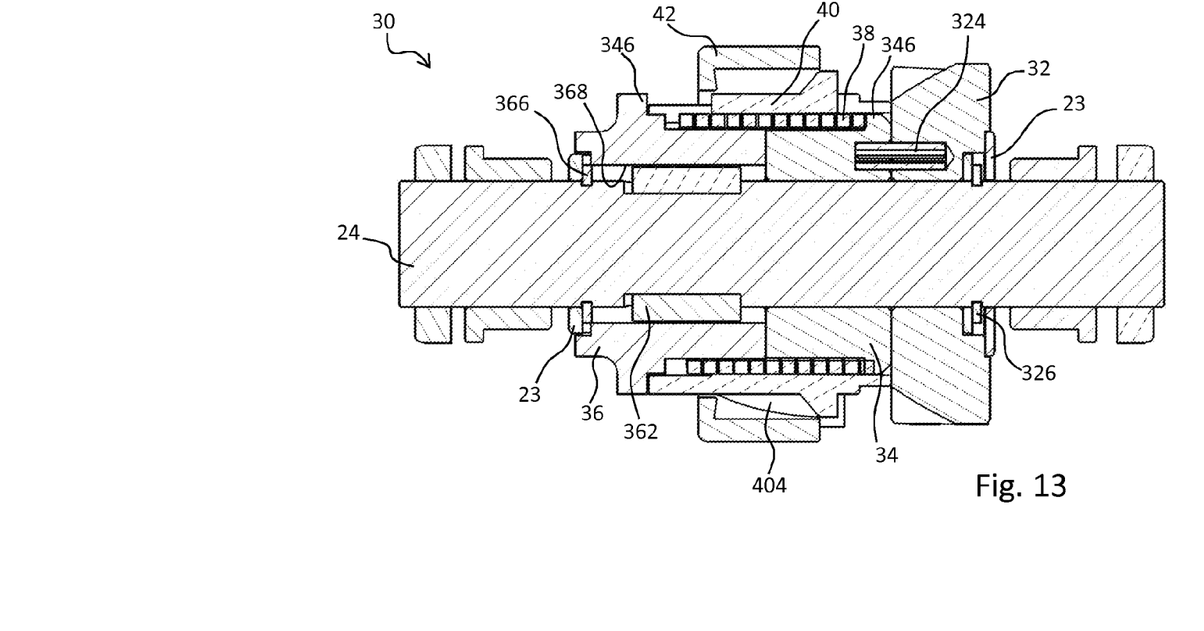
FIG. 13 shows an axially sectioned view of a compact clutch according to the invention.
Figure 14:
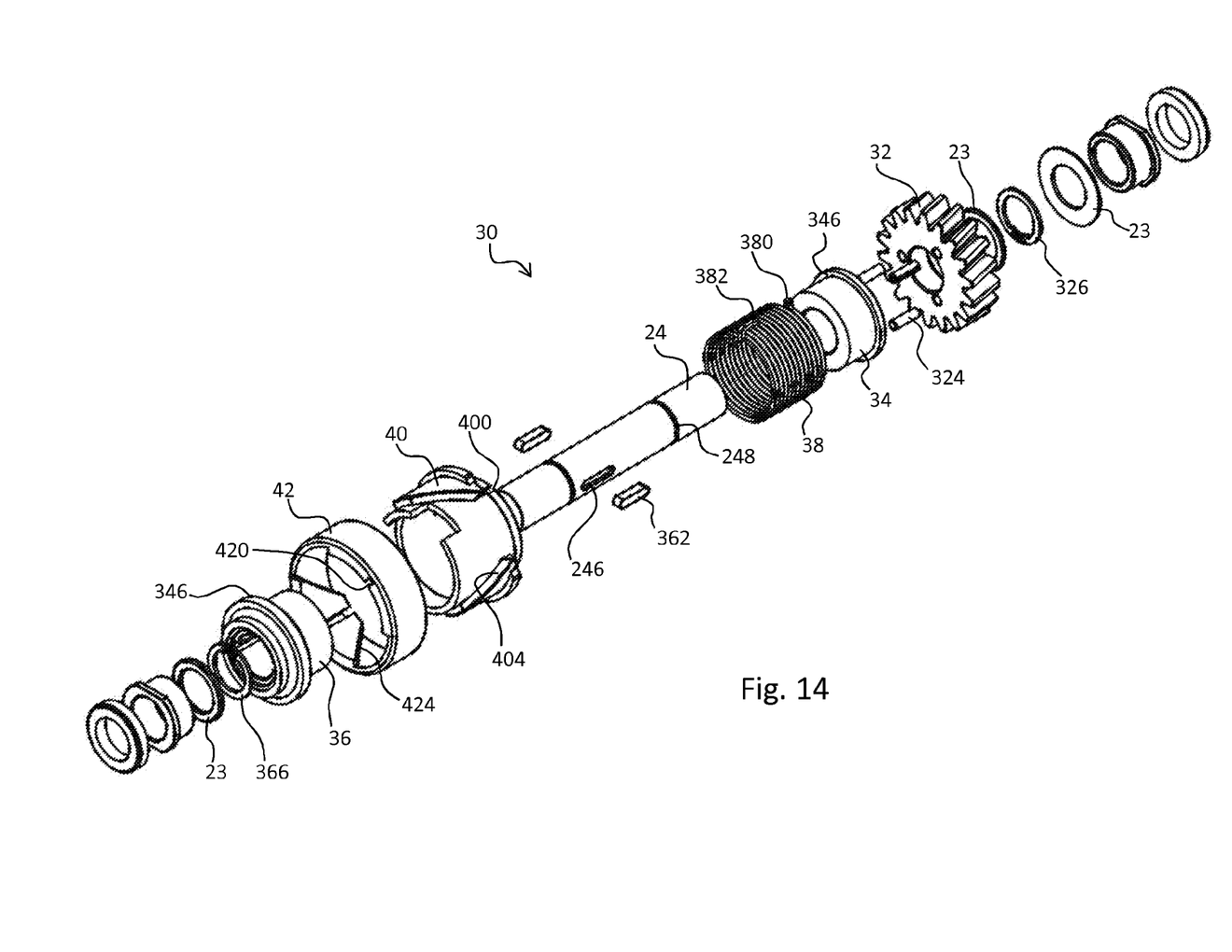
FIG. 14 shows an exploded perspective view of a compact clutch according to the invention.
Figure 15:
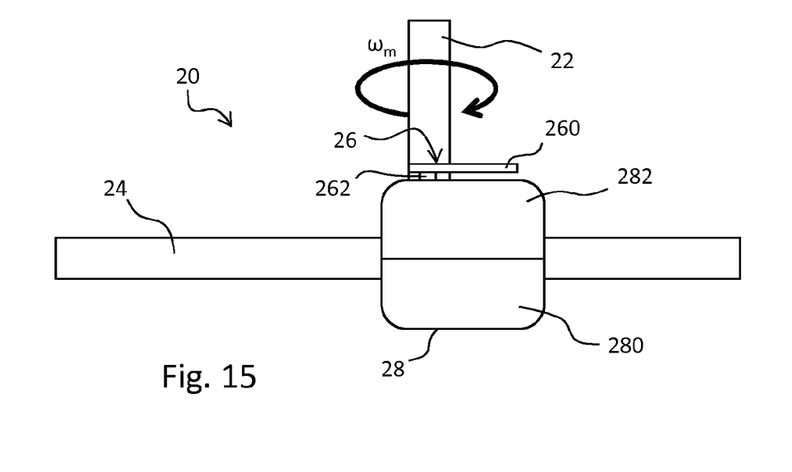
FIG. 15 shows a drive according to the invention in a view similar to that shown in FIG. 2.
Figure 16:
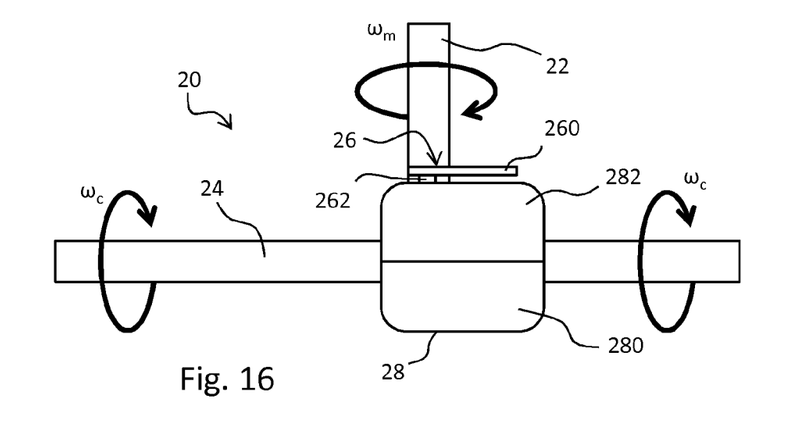
FIG. 16 shows a drive according to the invention in a view similar to that shown in FIG. 4.

The driving bush 34 and the driven bush 36 are therefore arranged next to each other where they have the same external diameter (see in particular the cross-section in FIG. 13). As the person skilled in the art may easily note, in the embodiment shown in the attached figures, each of the two bushes also comprises at least one shoulder 346, in the zones situated far from the other bush. These shoulders 346 are preferably provided to allow easy positioning of the other parts around the two bushes, such as the coil spring 38 and the collars 40 and 42. The shoulders 346 define therefore respective different external diameters, which are typically greater, compared to the external diameter of the two bushes which was considered before, for example in relation to the internal diameter of the coil spring 38.

The coil spring 38 has, in the rest condition, an internal diameter slightly greater than the external diameter of the driving bush 34 and the driven bush 36. In the rest condition of the coil spring 38, the bushes 34 and 36 may therefore rotate freely inside it.

When the drive 20 and the clutch 30 are in the rest configuration, the gear wheel 32 transmits its rotary movement to the driving bush 34 alone which freely rotates around the driven shaft 24 and inside the coil spring 28. The driven bush 36 is instead rigidly connected in the circumferential direction to the driven shaft 24, while the coil spring 38 is constrained in the circumferential direction by means of its two ends 380 and 382 to the first collar 40 and to the second collar 42.

When, instead, the operator decides to set the drive 20 and the clutch to the working configuration, he/she operates the control device 26 which applies an axial thrust onto the second collar 42. The axial movement of the second collar 42 with respect to the first collar 40, by means of the cam surfaces 404, 424, is converted into a relative circumferential movement of the two collars 40 and 42. Via the recesses 400 and 420, this movement is also imparted to the ends 380 and 382 of the coil spring 38. When the two ends 380 and 382 are moved with respect to each other in the direction of winding of the coil spring 38, the deformation which is induced tends to reduce the internal diameter of the said spring. The reduction in the internal diameter of the coil spring 38 which is thus obtained causes the latter to tighten around the two bushes 34 and 36 to the point of rigidly connecting them together by means of friction.

In the working configuration, therefore, the tightening of the coil spring 38 around the two bushes 34 and 36 rigidly connects together all the members in the circumferential direction and therefore causes the rotation of the gearwheel 32 to be transmitted to all other members and in particular to the driven shaft 24.

Finally, when the thrust of the control device 26 on the second collar 42 ceases, the latter returns into its rest configuration under the action of the coil spring 38 (imparting a circumferential displacement) and the cam surfaces 404 and 424 (which convert this displacement from circumferential to axial). The coil spring 38 then returns into the rest position and therefore assumes again an internal diameter slightly greater than the external diameter of the bushes 34 and 36 which are therefore disengaged again from each other.

The embodiment shown is configured so that the rotation of the gear wheel 32 and of the driving bush 34 are directed precisely in the direction of winding of the coil spring 38. In this way the action itself of the driving bush 34 assists tightening of the coil spring 38 and increases the rapidity and the gripping force of the latter on the bushes 34 and 36.

As already mentioned above, in the compact clutch 30 according to the invention, the axial position on the driven shaft 24 of the gear wheel 32, the driving bush 34 and the driven bush 36 is constrained by means of two stop rings 326, 366. More particularly, a first stop ring 326 forms a stop in the axial direction for the assembly consisting of the gear wheel 32 and the driving bush 34. The driven bush 36 bears against this assembly in the axial direction and in turn is also kept in position by a second stop ring 366.

The assembly consisting of the gear wheel 32 and the two bushes is therefore constrained axially to the driven shaft 24. Since the assembly formed by the coil spring 38 and by the two collars 40 and 42 is in turn constrained to the bushes 34 and 36 (for example by means of the shoulders 346 of the latter), the entire clutch 30 is axially constrained to the output shaft 24.

The two stop rings 326 and 366 may assume different forms, provided that they are able to ensure the axial stability of the clutch. These rings may for example be a seeger ring or benzing ring, which are well known to the person skilled in the art.

In accordance with a further aspect, the invention also relates to the drive 20 comprising the compact clutch 30. The drive 20 also comprises a housing 28 having in turn a box 280 and a lid 282. In the drive 20 according to the invention, the driven shaft 24 protrudes from the housing 28 at the joint between the box 280 and the lid 282.

In other words, the holes through which the driven shaft 24 protrudes from the housing 28 are formed half in the wall of the box 280 and half in the wall of the lid 282. As the person skilled in the art may easily understand, this configuration of the holes allows the insertion and removal of the shaft 24 in the radial direction rather than in the axial direction, as occurred in the prior art.

Preferably the drive 20 also comprises a control device 26 designed to move between a rest position and a working position. In the rest position the control device does not apply any thrust to the compact clutch 30 which is therefore located in its rest configuration. In the working position, instead, the control device 26 pushes the second collar 42 into the respective working position, thus producing fastening together of the bushes 34 and 36.

The control device 26 preferably comprises an external lever 260 which operates an auxiliary shaft 262 connected to a fork inside the housing 28. The fork is adapted to apply an axial thrust to the second collar 42, even when the latter is rotated.

The control device 26 advantageously comprises return means, for example a spring. In this way some advantages are obtained. Firstly, operation of the control device 26 by the user must overcome the action of the spring and this provides the user with an important indication of the return movement of the control device 26. Also the force of the spring action may be defined so as to satisfy specific needs, entirely independently of the power which is transmitted via the drive 20. Finally the spring of the control device 26 assists the drive 20 as a whole to return into the rest configuration once the user no longer exerts an action on the said control device 26.

The housing 28 of the drive 20 is furthermore advantageously adapted to receive, in addition to the mechanical components described above, also the lubricant necessary for ensuring correct operation thereof.

As the person skilled in the art may easily understand, the compact clutch 30 and the drive 20 according to the invention overcome the drawbacks mentioned above with reference to the prior art.

Firstly the clutch 30 according to the invention maintains all the advantageous characteristic features of the clutch of the known type and differs from it only in the way in which the different component parts are constrained to the driven shaft 24. In the clutch according to the prior art, the pin 364 provided a double (axial and circumferential) constraint for the driven bush 36, while there was no axial constraint on the side where the gear wheel 32 is located. For this reason the clutch as a whole was constrained axially by the walls of the housing 28. In the case of wear, this constraint became insufficient and gave rise to play and malfunctioning of the clutch 30 according to the prior art. The clutch according to the invention is instead axially constrained by the two stop rings 326 and 366 such that, even in the case of wear, the axial constraint remains absolutely identical. In other words, in the drive 20 according to the invention the play which may arise from wear would be confined between the clutch 30 and the walls of the housing 28, while it would not arise at all inside the clutch 30 itself. The compact clutch 30 according to the invention is therefore more resistant to wear than the clutch according to the prior art.

Moreover, as mentioned above, the provision of the pin 364 according to the prior art resulted in a significant weakening of the driven shaft 24 owing to the hole needed to seat it. Owing to the replacement of the pin with the stop rings 326 and 366 on the one hand and the tongues 362 on the other hand, the mechanical characteristics of the driven shaft 24 may be maintained practically unchanged. The recesses 248 necessary for receiving the stop rings 326, 366 and the recesses 246 necessary for receiving the tongues 362 are in fact surface incisions which do not reduce substantially the resistant cross-section of the shaft itself. These recesses may advantageously comprise suitable fillet radii so as to minimize the effect of stress concentration, in a manner known per se to the person skilled in the art. Basically, therefore, the present invention provides a compact, wear-resistant and robust clutch 30.

Moreover, the drive 20 according to the invention as a whole allows greater flexibility during assembly and supply compared to the known constructional forms. In fact, in the drive according to the prior art, the driven shaft 24 protrudes from the housing 28 through the holes formed in the wall of the box 280. This obviously means that assembly of the clutch 30 is dependent on the presence of the box 280. During assembly according to the prior art, firstly the various components of the clutch 30 must be arranged next to each other, then they must be introduced into the box 280 and only at the end may the driven shaft 24 be inserted. The pin 364 is the last part which is assembled and it fastens together the assembly of all the other components which up to that moment are in fact subject to undesirable movements which may also result in disassembly of the clutch 30. In the assembly according to the invention, instead, since the driven shaft 24 projects from the housing 28 at the joint between the box 280 and the lid 282, the clutch 30 may be assembled independently of the housing 28 and introduced radially into the latter subsequently. Moreover, the presence of two axial constraints along the shaft (the two stop rings 326 and 366) allows handling of the assembled clutch without any danger of it becoming disassembled in an unwanted manner.

The clutch 30 according to the invention may therefore be pre-assembled and handled without any problems even without the associated housing 28. As a result of this feature, for example only the compact clutch 30 may be supplied where the client wishes to use an existing housing 28 different from that proposed in the drive 20. This possibility was not contemplated by the solution of the prior art.

The person skilled in the art, in order to satisfy specific requirements, may make modifications to the embodiments of the compact clutch 20 and of the drive 20 described above and/or replace the parts described with equivalent parts, without thereby departing from the scope of the accompanying claims.

The invention claimed is:

1. Compact clutch comprising a driven shaft on which the following are mounted:
    a gear wheel;
    a driving bush;
    a driven bush;
    a coil spring with first and second ends;
    a first collar comprising a first recess and cam surfaces on the collar's radially outer surface; and
    a second collar comprising a second recess and cam surfaces on the collar's radially inner surface;
    wherein:
        the gear wheel, the driving bush and the driven bush are arranged axially next to each other;
        the gear wheel and the driving bush re constrained together in a circumferential direction;
        the driving bush and the driven bush each have an external diameter that is the same;
        the coil spring has, in a rest condition, an internal diameter slightly greater than the external diameter of each of the driving bush and the driven bush;
        the coil spring surrounds externally the driving bush and the driven bush;
        the first collar surrounds externally the coil spring and the first recess receives the first end of the coil spring; and
        the second collar surrounds externally the first collar and the second recess receives the second end of the coil spring;
    and wherein:
        the second collar is displaceable in an axial direction between a rest position and a working position;
        whereby when the second collar is in the rest position the coil spring is in a rest condition; and
        when the second collar is displaced into the working position:
            the cam surfaces convert axial displacement of the second collar into a relative rotation between the first collar and the second collar; and
            the relative rotation between the first collar and the second collar produces a relative rotation between the first end and the second end of the coil spring;
            whereby the relative rotation between the first end and the second end produces a tightening of the coil spring around the driving bush and the driven bush; and
            the tightening of the coil spring constrains together by means of friction the driving bush and the driven bush;
    and wherein:
        the gear wheel, the driving bush and the driven bush are constrained to the driven shaft in the axial direction by means of two stop rings;
        the driven bush is constrained to the driven shaft in the circumferential direction by means of at least one tongue; and
        the at least one tongue ensures engagement between the driven bush and the driven shaft in the circumferential direction, while in the axial direction the driven bush is slidable with respect to the driven shaft in at least one direction.

2. The clutch according to claim 1, wherein each of the two bushes, in a zone far from other of the two bushes, comprises at least one shoulder, the shoulders of the two bushes being adapted to constrain axially the coil spring and the first and second collars to the two bushes.

3. The clutch according to claim 1, wherein rotation of the gear wheel and the driving bush is directed in a direction of winding of the coil spring.

4. The clutch according to claim 1, wherein the stop rings consist of seeger rings or benzing rings.

5. Drive comprising:
    a compact clutch according to claim 1; and
    a housing comprising a box and a lid;
    wherein the driven shaft protrudes from the housing at joint between the box and the lid.

6. The drive according to claim 5, further comprising a control device movable between a rest position in which the device applies no outward thrust to the compact clutch and a working position in which the device axially pushes the second collar into the respective working position.

7. The drive according to claim 6, wherein the control device comprises an external lever which operably controls a fork inside the housing via auxiliary shaft connected to the fork.

8. The drive according to claim 7, wherein the fork is adapted to apply an axial thrust to the second collar when the second collar is rotating.

9. The drive according to claim 6, wherein the control device also comprises return means.

10. The clutch according to claim 2, wherein rotation of the gear wheel and the driving bush is directed in a direction of winding of the coil spring.

11. Drive comprising:
    a compact clutch according to claim 2; and
    a housing comprising a box and a lid;
    wherein the driven shaft protrudes from the housing at joint between the box and the lid.

12. The drive according to claim 11, further comprising a control device movable between a rest position in which the device applies no outward thrust to the compact clutch and a working position in which the device axially pushes the second collar into the respective working position.

13. The drive according to claim 12, wherein the control device comprises an external lever which operably controls a fork inside the housing via auxiliary shaft connected to the fork.

14. The drive according to claim 13, wherein the fork is adapted to apply an axial thrust to the second collar when the second collar is rotating.

15. Drive comprising:
   a compact clutch according to claim 3; and
   a housing comprising a box and a lid;
   wherein the driven shaft protrudes from the housing at joint between the box and the lid.

16. The drive according to claim 15, further comprising a control device movable between a rest position in which the device applies no outward thrust to the compact clutch and a working position in which the device axially pushes the second collar into the respective working position.

17. The drive according to claim 16, wherein the control device comprises an external lever which operably controls a fork inside the housing via auxiliary shaft connected to the fork.

18. The drive according to claim 17, wherein the fork is adapted to apply an axial thrust to the second collar when the second collar is rotating.

19. The drive according to claim 7, wherein the control device also comprises return means.

20. The drive according to claim 8, wherein the control device also comprises return means.

21. The clutch according to claim 1, wherein the at least tongue ensures engagement between the driven bush and the driven shaft in the circumferential direction.

22. The clutch according to claim 1, wherein the two stop rings are positioned on the driven shaft opposing ends of the clutch, ensuring collective engagement of the gear wheel, the driving bush, and the driven bush.

* * * * *